United States Patent [19]

Kobayashi

[11] Patent Number: 5,726,638

[45] Date of Patent: Mar. 10, 1998

[54] METHOD AND DEVICE FOR SERIAL COMMUNICATION

[75] Inventor: Masayuki Kobayashi, Anjo, Japan

[73] Assignee: Nippondenso Co., Ltd., Kariya, Japan

[21] Appl. No.: 552,531

[22] Filed: Nov. 6, 1995

[30] Foreign Application Priority Data

Dec. 12, 1994 [JP] Japan ................. 6-307958

[51] Int. Cl.⁶ ................. H04L 1/16; H04L 5/14; H04J 3/06
[52] U.S. Cl. ................. 340/825.07; 340/825.2; 340/825.5; 340/825.16; 340/825.62; 307/11; 307/36; 180/287; 370/241; 370/242; 370/244; 371/5.4; 371/5.5; 371/47.1
[58] Field of Search ............... 340/825.07, 825.06, 340/825.2, 825.5, 825.16, 825.62; 307/11, 36; 371/5.4, 5.5, 47.1; 370/241, 242, 244; 180/287; 375/355

[56] References Cited

U.S. PATENT DOCUMENTS

| 4,991,184 | 2/1991 | Hashimoto | ............... 375/8 |
| 5,398,238 | 3/1995 | Inagawa et al. | ............... 370/29 |

FOREIGN PATENT DOCUMENTS

| 55-053939 | 4/1980 | Japan . |
| 63-207244 | 8/1988 | Japan . |
| 2-240753 | 9/1990 | Japan . |

Primary Examiner—Michael Horabik
Assistant Examiner—Yonel Beaulieu
Attorney, Agent, or Firm—Cushman Darby & Cushman IP Group of Pillsbury Madison & Sutro LLP

[57] ABSTRACT

An asynchronous serial communication device in which data transmitted at different speeds coexist and are exchanged. Time losses when errors are generated are effectively eliminated when asynchronous serial data communications for diagnostic failures are performed between a diagnosing tool and an electronic controller via a communications line. In performing the data communications, first data are exchanged between these devices at a low transmission speed and then by switching the speed to high speed various data are exchanged. In a case where communication errors are generated during exchanging, the operation is started again from the data exchanging at the low speed. Here, the edges of the data sampled at the low speed are detected by an edge detecting terminal provided in a communication circuit. A communication error is identified when a difference between a first edge detecting time and a next edge detecting time is shorter than 1 bit time of the low transmission speed data. Based on a further next edge detecting timing, the data receiving by the low speed sampling is started over again.

15 Claims, 6 Drawing Sheets

METHOD AND DEVICE FOR SERIAL COMMUNICATION

CROSS REFERENCE TO RELATED APPLICATION

This application claims priority from Japanese Patent Application No. 6-307958 filed on Dec. 12, 1994, the content of which is incorporated herein by reference.

BACKGROUND OF THE INVENTION

1. Field of the Invention

The present invention relates to a method and device for serial communication in a communication system for performing diagnostic data communication between various kinds of electronic controllers mounted on vehicles, such as an engine electronic controller, a transmission electronic controller and the like, and a diagnostic tool (diagnostic devices) externally connectable thereto. The invention is designed to improve the structure of a communication device for increasing data receiving efficiency in these electronic controllers.

2. Description of Related Art

There has been tremendous progress in the use of electronic equipment for vehicles in recent years, realized; and by means of microcomputers and high-level electronic control of devices mounted on various parts of vehicles including engines, transmissions and the like. As a result, controllability of these devices has been improved by leaps and bounds. On the other hand, however, diagnosing problems or malfunctions of these devices has been made more complicated.

Under these circumstances, various measures have been taken to deal with diagnosing vehicular system, which is becoming increasingly complex. The measures taken thus far include improvements to a number of on-vehicle electronic controllers by adding self-diagnostic functions thereto, which allow diagnosing of the problems of on-vehicle equipment and the controllers simultaneously when the equipment is controlled, and devising of a system connectable to external diagnostic devices called diagnostic tools making the system capable of performing higher level problem diagnostics and diagnostic data analysis under the support of the diagnostic tools and the like. Recently, in particular, attention has been increasingly paid to a method of diagnosing a vehicular system with various on-vehicle electronic controllers under the support of the external diagnostic tool. By this method, predetermined optional diagnostic data can be flexibly specified externally by the diagnostic tool and highly reliable analysis can be performed based on the diagnostic data received thereby.

Figure 6:
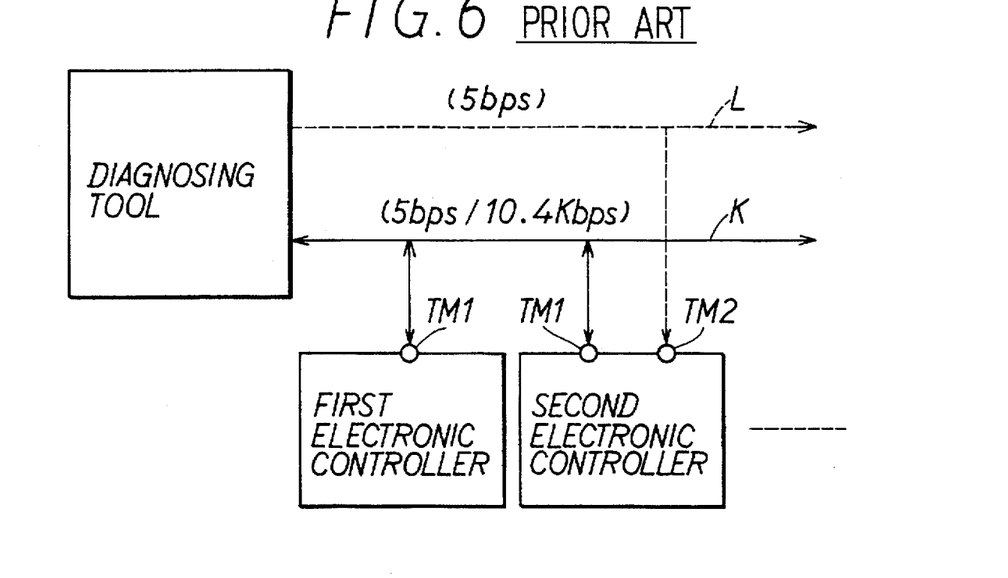
FIG. 6 is a block diagram showing the structure of a conventional communication system between a diagnostic tool and on-vehicle electronic controllers.

When a vehicular system is diagnosed by using the external diagnostic tool, data communication is performed between the diagnostic tool and the electronic controllers usually based on a system structure specified by International Standard ISO-9141 like that shown in FIG. 6.

According to this Standard, serial data communications for diagnosis are performed by using only one two-way or bidirectional communications line called a K line or using two communications lines formed by adding a one-way or unidirectional communications line called a L line to this K line.

The K line is usually used when a data linkage is to be established between the diagnostic tool and the electronic controllers. More specifically, this line is used together with the L line when address information is transmitted from the diagnostic tool to the electronic controllers targeted for initialization and diagnosis. After this initialization is completed, this line is singly used as a communications channel through which various messages are exchanged between the diagnostic tool and the electronic controllers.

On the other hand, the L line which is a one-way communications line from the side of the diagnostic tool, is used as a communications channel for providing instructions to start communications to the electronic controllers only when address information is transmitted from the diagnostic tool to the electronic controllers targeted for to initialization and diagnosis. In other cases this line is maintained in an idle state (a logical H (high) level).

Thus, it is preferable in terms of accurately understanding the starting of the communications that the electronic controllers are provided with two communication terminals TM1 and TM2 corresponding to these K and L lines. In reality, however, as shown in FIG. 6, all the electronic controllers are not necessarily equipped with two such communication terminals.

Figure 7:
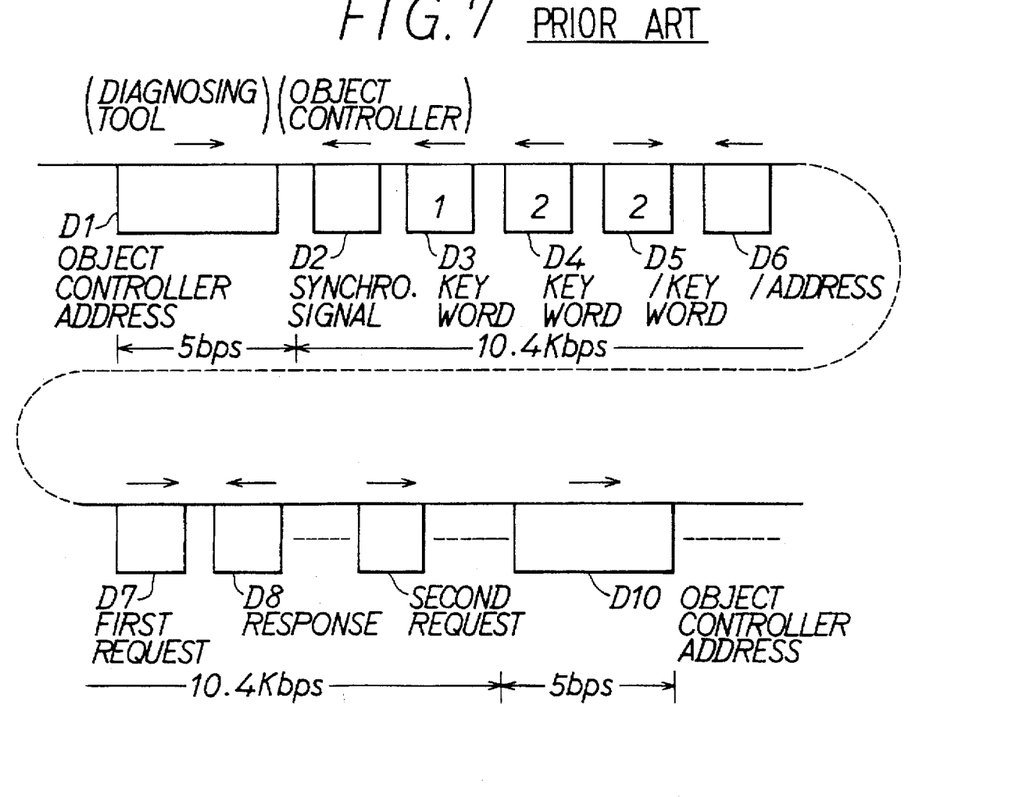
FIG. 7 is a time chart showing a communication procedure based on the international Standard ISO-9141 for the communication system.

Given a situation like this, the Standard regulates, as described above, that the communication system can be established even when only one K line is used and communication specifications and procedures are arranged in order to allow normal data exchange even in such a case. FIG. 7 shows one example of the communication procedures arranged according to the Standard ISO-9141 and executed through the K line.

As shown in FIG. 7, according to the Standard, the data communications for performing a diagnosis follow the following procedure:

(1) "Address" information of the object electronic controller is sent as data D1 from the diagnostic tool to the electronic controller targeted for diagnosis. Transmission of this "address" information is performed at a low speed of 5 bps (bit/sec.), etc., so as to surely form a data linkage between these devices.

(2) After receiving the address information and identifying its own address, the electronic controller sends "a synchronizing signal", "a key word 1" and "a key word 2" as data D2, D3 and D4 in sequence to the diagnostic tool. The data communications thereafter including transmission of these data D2 to D4 are executed by being switched to a high speed of 10.4 Kbps, etc.

(3) After receiving the data D2 to D4, for the purpose of confirmation, the diagnostic tool forms data "/keyword 2" by reversing the logic of the "keyword 2" as data D5 and sends this to the electronic controller.

(4) After receiving the data "/keyword 2" which is the reverse of the logic of the "keyword 2", for the purpose of further confirmation, the electronic controller forms data "/address" by reversing the logic of its own "address" as data D6 and sends this to the diagnostic tool.

(5) After confirming the object electronic controller targeted for diagnosis through the data exchanges in (1) to (4), the diagnostic tool completes initialization and sends "a first request message" as data D7 for starting a specified diagnosis to the electronic controller.

(6) After receiving the "first request message", the electronic controller forms "a response message" as data D8 in order to respond to the request and sends this to the diagnostic tool.

(7) After receiving the "response message", the diagnostic tool sends second, third, . . . "request messages" to the electronic controller when necessary and ends the communications relating to the diagnosis by receiving a last "response message" given by the electronic controller in response to a last "request message".

(8) The diagnostic tool repeats transmission of the "address" information at the speed of 5 bps (data D10) when necessary, including reexecution of the diagnostic, doing the diagnostic over again because of communication failures and the like.

Figure 8:
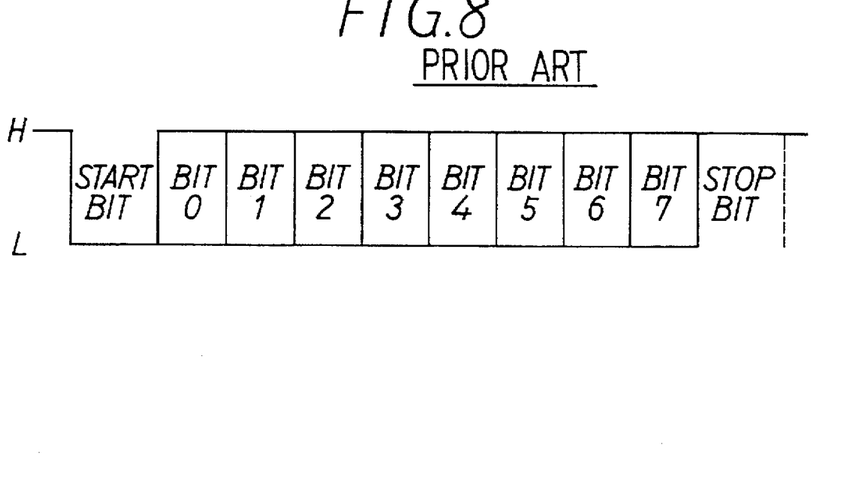
FIG. 8 is a time chart showing the bit format of a data byte.

An 8 bit NRZ (non-return zero) system like that shown in FIG. 8 is adopted for a bit format of each data byte constituting the above-mentioned data and messages. A start bit of a logical L (low) level is added to the head thereof while a stop bit of a logical H (high) level is added to the end, enabling recognition of existence of the data byte.

Thus, in asynchronous communications which do not need private or exclusive synchronous lines, data is fetched by detecting the start bit edge of the data transmitted to a signal line and then sampling only a specified bit length every 1 bit time.

This means, in other words, that as long as sampling of a specified bit length is not finished after the start bit edge is detected, communication failures which occur cannot be detected. When communication failures are detected, the communication procedure is repeated from the start including "address" information exchanges and initialization, and on the receiving side the procedure is repeated from sampling at the low speed of 5 bps so as to receive the "address" information.

On the other hand, in the protocol which allows coexistence of data communications based on low and high speed transmissions each time a series of communications are performed as in the procedure according to the International Standard ISO-9141 for a vehicle diagnostic communication system, shifts in communication synchronization are generated due to noise, etc., making it possible for data transmitted at a high speed to be received by low speed sampling.

When this situation occurs, the following inconveniencies will take place together with the above-described characteristics of the asynchronous communication:

(1) Detection of communication failures is possible only after the low speed sampling is performed by the specified bit length. That is, it takes a long time for a communication failure to be detected.

(2) For this reason, restoration of communication synchronization is delayed, extending the period of time for diagnosing a vehicle itself.

This is described further in detail by referring to FIGS. 9(a) and 9(b) in the following.

Figure 9A:
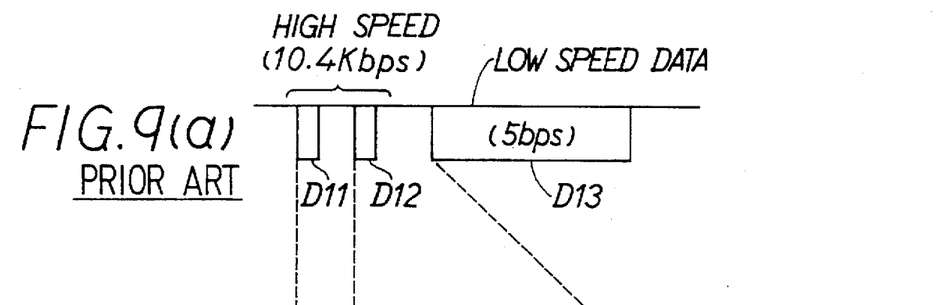
FIGS. 9(a) and 9(b) are time charts showing receiving processing modes when errors occur in the conventional communication device.
Figure 9B:
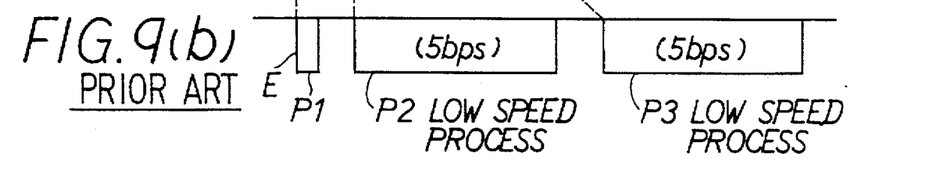

Here, it is assumed that with respect to data transmitted by the diagnostic tool in a mode shown in FIG. 9(a), an error E is generated during the operation process P1 of receiving data D11 on the electronic controller side as shown in FIG. 9(b). In this case, since the processing is started again from the low speed sampling on the electronic controller side, a receiving operation process P2 by the low speed sampling is started accompanying the detection of the start bit edge of data D12 transmitted at a high speed. Once such receiving operation process P2 by the low speed sampling is started, the error cannot be detected until the sampling of a specified bit length (in this case, 200 ms×10 bits=2 s length) is finished. As a result, on the electronic controller side, a receiving operation process P3 by the low speed sampling is executed again with respect to low speed data D13 as shown in FIG. 9(b) after the operation process P2 is over. According to the Standard ISO-9141, maximum time given to the diagnostic tool from detecting communication errors to starting retransmission of data ("address" information) at a low speed of 5 bps, etc., is set at 300 ms. Thus, in the worst case, it is possible that without correction of such shifts in synchronization, the low speed data exchanges are repeated endlessly.

Conventionally, switching of the speeds by which the received data is sampled on the electronic controller has been made possible by replacing receiving registers in which exclusive sampling speeds are set.

In the foregoing description, as a matter of convenience, reference was made only to the data communications between the diagnostic tool and various on-vehicle electronic controllers based on the International Standard ISO-9141. However, the above-described situations generally apply to an environment in which in asynchronous serial communications data transmitted at different speeds coexist and are exchanged.

SUMMARY OF THE INVENTION

The present invention has been made in view of the above-described background and it is an object of the invention to provide a method and device for serial communication capable of eliminating time losses in a preferred way at the time of error occurences even in an asynchronous serial communication environment in which data transmitted at different speeds coexist and are exchanged.

According to the present invention, edge detecting means and error processing means are provided. At the time of receiving data by means of low speed sampling, a communication error is identified to be generated when a difference between first edge detecting time and next edge detecting time by the edge detecting means is shorter than 1 bit time of data transmitted at a low speed and the data receiving is repeated again by the low speed sampling based on timing with which the edge detecting means detects a further next edge. This error processing makes it possible to accurately detect the existence of the communication error in "the timing with which the edge detecting means detects the further next edge" even during receiving of the data by this low speed sampling. Also, by repeating the data receiving by the low speed sampling based on this timing, communication synchronization thereof can be restored with this timing in the shortest case. In short, by performing this error processing, time losses at the time when errors occur can be eliminated in a preferred way restoring the communication synchronization in a shorter time.

If the edge detecting means is provided separately from a communication terminal for exchanging the serial data and an edge detecting terminal is provided especially for identifying the threshold values of changes in the logic levels of the serial data, that is, if the means is constructed as hardware for performing edge detection, the edge of the serial data can be surely detected irrespective of the transmitting speed thereof and the receiving sampling speed.

The edge detecting means can also be constructed as software for detecting the edge when data inputted from the communication terminal for receiving the serial data are sampled at predetermined time intervals and the signals of the sampled data show a specified difference in levels between the two respectively. That is, since the error processing based on this edge detection is executed when the data are received by the low speed sampling, even in such a structure constructed as software for detecting the edge of the serial data, this processing is sufficiently dealt with in terms of speeds. Moreover, in this case, special hardware is unnecessary and the edge detecting means can be realized more easily.

The serial data communications by means of the asynchronization are executed within a communication system in which a plurality of on-vehicle electronic controllers as slave devices and an external device as a master device are connected or one of the controllers and the external device are connected via a communications channel. The data transmitted at the low speed is the address data of the slave device to be first transmitted to from the master device thereto when a data linkage is to be established between the master device and the slave device. In the serial communication device, the slave device receives the address data by means of low speed sampling.

If the device is constructed in this way, even in the case of data communications between a diagnostic tool and various on-vehicle electronic controllers, time for diagnosing the failures of a vehicle is not unnecessarily lengthened due to errors in the communications and the overall diagnosing time can even be shortened.

BRIEF DESCRIPTION OF THE DRAWINGS

In the accompanying drawings:

FIGS. 5(a) to 5(c) are time charts respectively showing mainly receiving processing modes when errors occur in the device in the preferred embodiment;

DETAILED DESCRIPTION OF THE PREFERRED EMBODIMENTS

Figure 1:
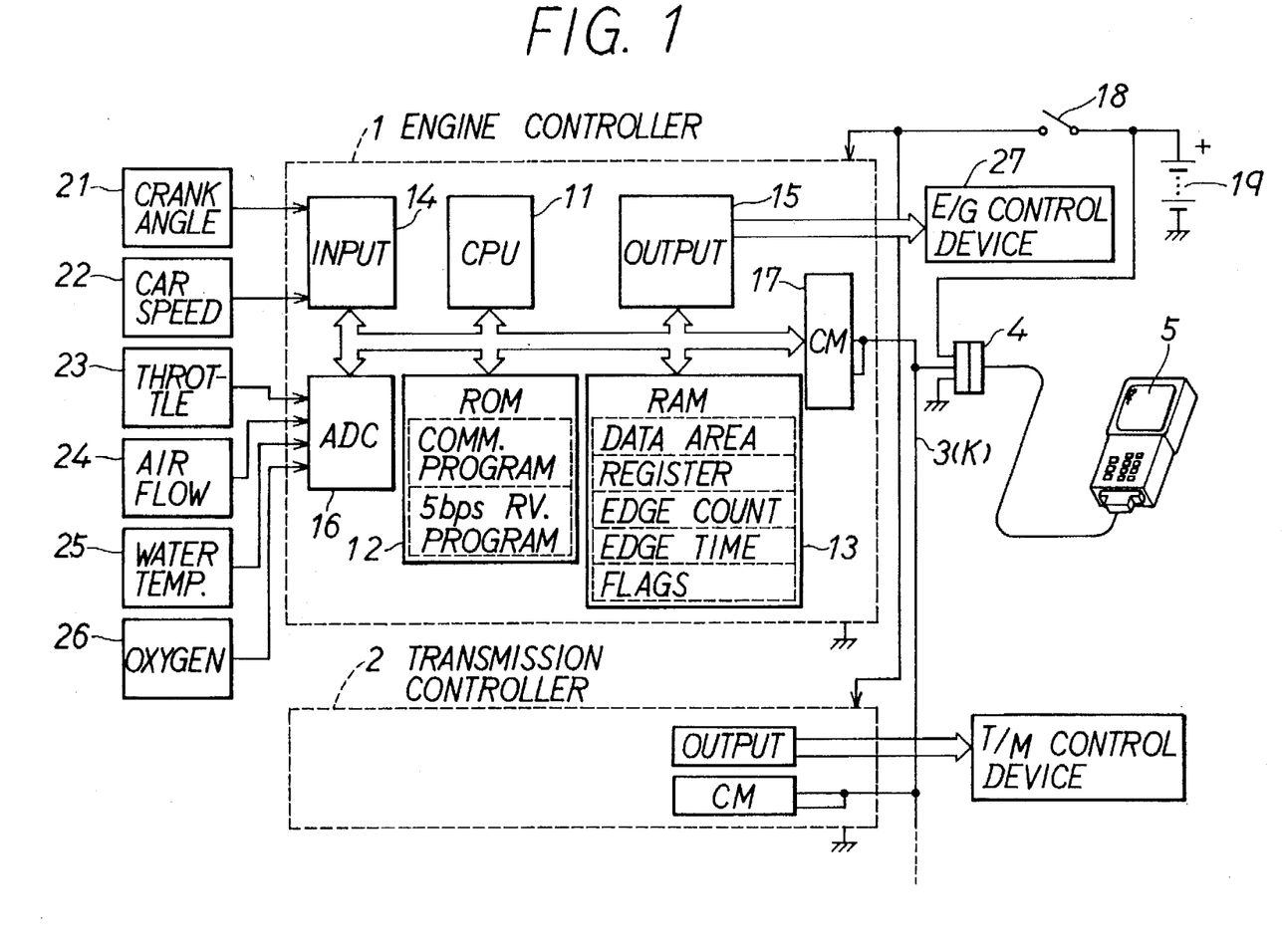
FIG. 1 is a block diagram showing a preferred embodiment of a serial communication device of the invention.

FIG. 1 shows one preferred embodiment of a method and device for serial communication according to the present invention.

In the preferred embodiment, the device is constructed as an asynchronous serial communication system for performing data communication for diagnostic between various on-vehicle electronic controllers and a diagnostic tool externally connectable thereto, especially for maintaining the data receiving efficiency of the controllers at a high level.

First, explanation will be made of the structures of the communication system and the communication device in the preferred embodiment.

In the communication system, a plurality of on-vehicle electronic controllers comprising, for instance, an engine controller 1 and a transmission controller 2 are connected via a communications line 3 (equivalent to the above-mentioned K line) and, to these on-vehicle electronic controllers, a diagnostic tool 5 as an external diagnostic device is further connected via the communications line 3 and a diagnosis connector 4. As a communication system between the external diagnostic tool 5 and on-vehicle electronic controllers connected to one another, for instance, the engine controller 1 and the transmission controller 2, a multiplex communication system called SCI (Serial Communication Interface) is used. As communication protocol for multiplex communications, one conforming to the Standard ISO-9141 which is an International Standard Organization in Europe is used.

Each of these elements will be described in detail hereinbelow.

Here, as one example of the on-vehicle electronic controllers, the structure and function of the engine controller 1 is explained.

The engine controller 1 is, as shown in FIG. 1, comprises by a CPU 11, a ROM 12, a RAM 13, an input circuit 14, an output circuit 15, an AD conversion (ADC) circuit 16, a communication circuit (CM) 17, etc.

The communication circuit 17 is a circuit having functions for mainly converting the ISO-9141 signal format of a diagnostic request message sent from the diagnostic tool 5, that is, 10 bit format of SCI (see FIG. 8), into a digital signal to be read by the CPU 11, reverse-converting a response message outputted from the CPU 11 in the ISO-9141 message format into the 10 bit format of SCI, etc. These bit format converting functions can be realized in hardware called a UART (an asynchronous communication circuit) and the content of a message constructed based on the 10 bit format of SCI can be processed by software.

Inputted to the input circuit 14 constituting the engine controller 1 are sensor signals mainly made of pulse signals outputted from such sensors as a crank angle sensor 21 for detecting an engine speed, a car speed sensor 22, and the like while inputted to the AD conversion circuit 16 are sensor signals made of analog signals outputted from such sensors provided on respective parts of a vehicle as a throttle sensor 23, an air flow meter 24, a water temperature sensor 25, an O₂ (oxygen) sensor 26 and the like. These sensor signals are stored in a data area in the RAM 13 as sensor data corresponding to the detected values thereof and utilized as operation values on the basis of which the CPU 11 calculates a fuel injection quantity and ignition time.

The CPU 11 calculates a fuel injection quantity and ignition time each time by executing a specified operation based on the sensor data fetched in the RAM 13 in accordance with a control program preinstalled in the ROM 12, exchanges communication messages (described later) with the diagnostic tool 5 and executes diagnostic processing specified through the messages.

The fuel injection quantity thus calculated by the CPU 11 is given to the output circuit 15 and a signal corresponding to the obtained fuel injection quantity is outputted through this output circuit 15 to engine control device 27. As the engine control device 27, for instance, a fuel injection valve can be used.

When the diagnostic processing is operated, the sensor data fetched in the RAM 13 are sequentially read by the CPU 11 in accordance with an instruction given by the diagnostic tool 5 for reading RAM values and the data thus read are outputted as diagnostic data to the communications line 3 via the communication circuit 17.

Meanwhile, the diagnostic tool 5 is electrically connectable to the on-vehicle electronic controllers (in this case, the engine controller 1, the transmission controller 2, etc.) via the diagnostic connector 4 when the on-vehicle electronic controllers or the vehicular system therethrough need to be diagnosed, and reads the data read as the diagnostic data and supports diagnosing of these data.

The diagnostic tool 5 usually reports the existence of errors in the data to those who perform diagnosing by displaying the read diagnostic data altogether on a display or by graphically displaying them.

Electric power is supplied from a battery 19 to the diagnostic connector 4 through an ignition switch 18 and power is also supplied to the diagnostic tool 5 via the diagnostic connector 4 when the tool 5 is electrically connected to the on-vehicle electronic controllers.

Next, the terminal structure of the communication circuit 17 constituting the communication device in the preferred embodiment will be explained by referring to FIG. 2.

Figure 2:
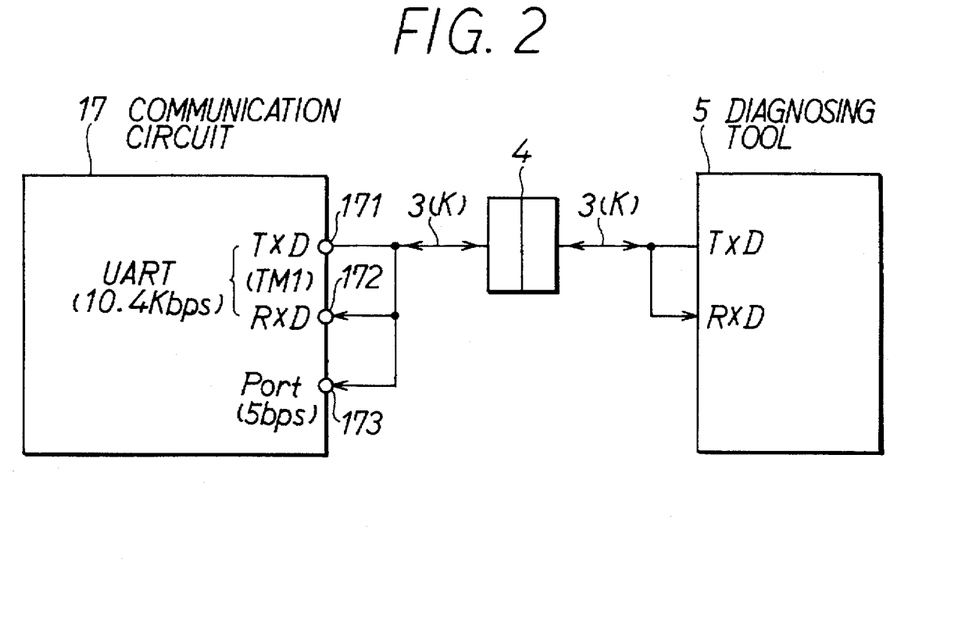
FIG. 2 is a block diagram showing a terminal structure of a communication circuit shown in FIG. 1.

As shown in FIG. 2, the communication circuit 17 is constructed by data transmission and receiving terminals (TxD) 171 and (RxD) 172 and an edge detecting terminal (Port) 173 specially set for identifying the threshold values of changes in logical levels when the data are received at a low speed (sampling).

Here, the transmission and receiving terminals (TxD and RxD) 171 and 172 are equivalent to the communication terminal TM 1 corresponding to the K line in FIG. 6 and constructed as part of the UART (asychronous communication circuit) for realizing the bit format conversion function in the communication circuit 17.

The edge detecting terminal (Port) 173 is a terminal equivalent to a port input usually provided in a CPU, and in the communication device in the embodiment the edge parts of the received serial data (timing) are monitored through this edge detecting terminal 173.

Furthermore, in the communication device in the embodiment, the speed of the data sampling by this edge detecting terminal 173 is fixed at 5 bps while that of the data transmission by the transmission terminal 171 and that of the data sampling by the receiving terminal 172 are fixed at 10.4 Kbps.

As previously described, the data communications between the diagnostic tool and the communication device in the embodiment (controller 1 or 2) executed based on the International Standard ISO-9141 follow the conventional procedure shown in FIG. 7.

Figure 3:
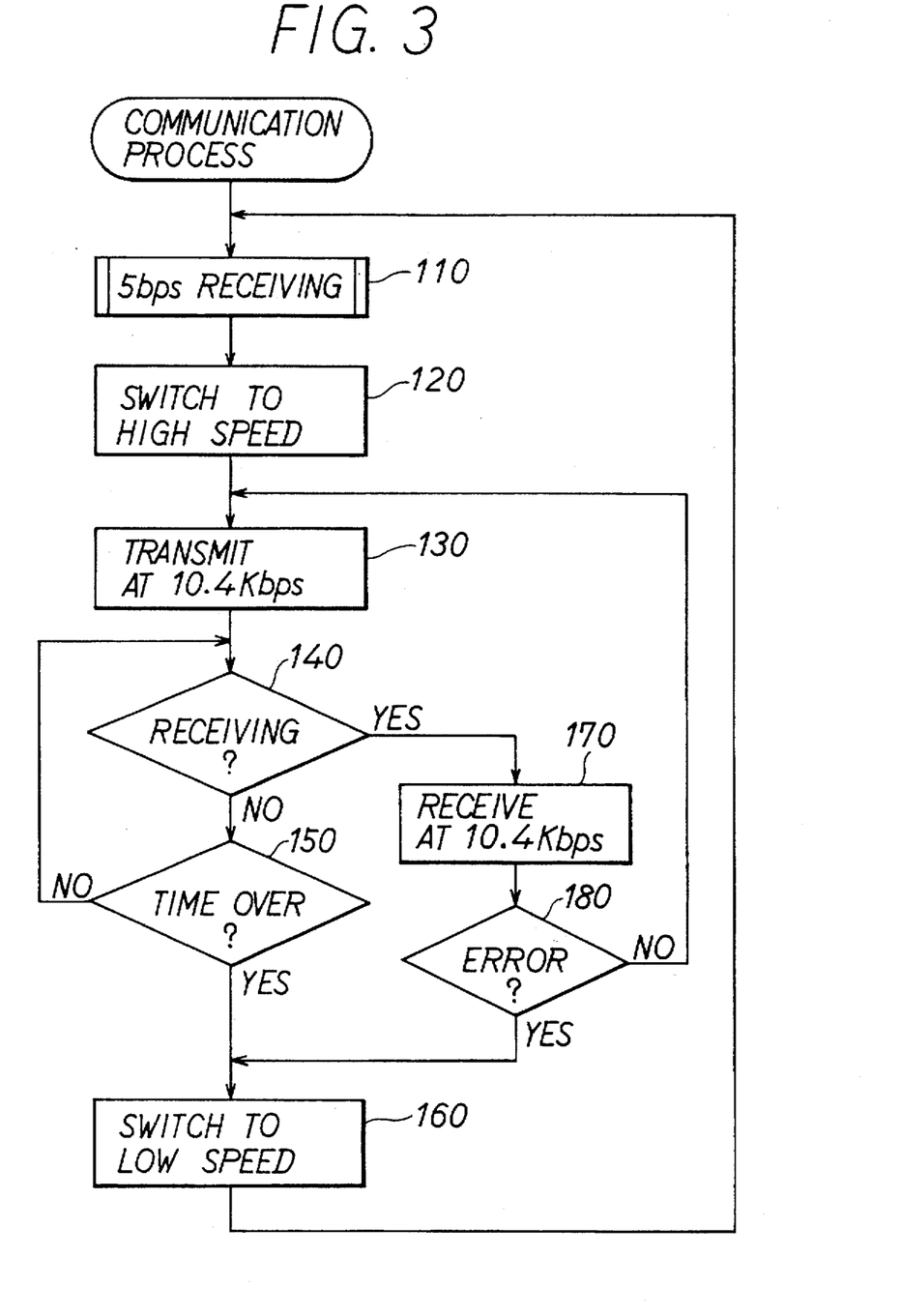
FIG. 3 is a flow chart showing a communication processing procedure in each electronic controller.
Figure 4:
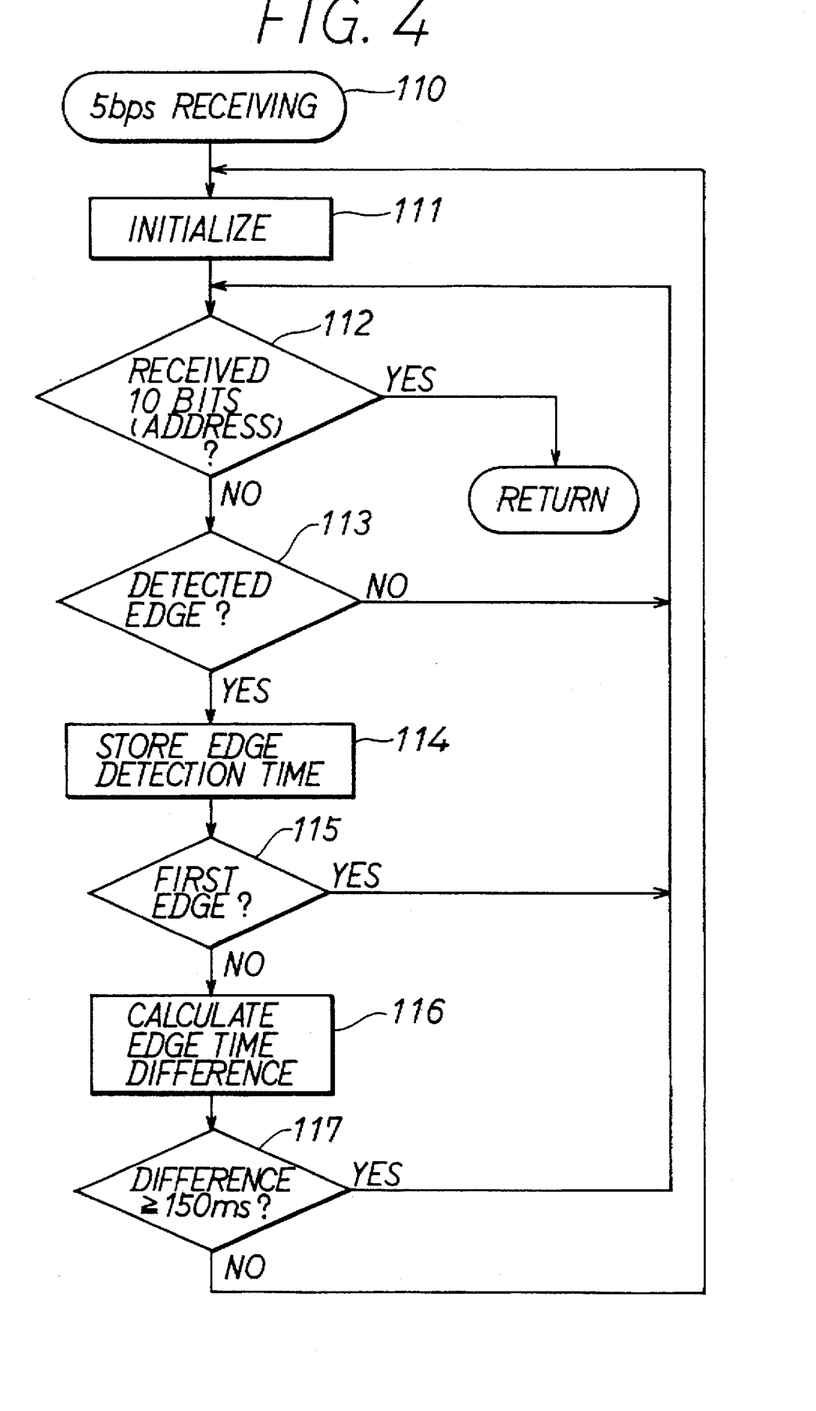
FIG. 4 is a flow chart showing in detail a communication processing, in particular a receiving processing at a speed of 5 bps.

FIGS. 3 and 4 show procedures to be performed when the asynchronous serial data communications are performed mainly through the CPU 11 and the communication circuit 17 in the communication device in the embodiment. Next, a detailed explanation of the operation of the communication device in the preferred embodiment will be given by referring to FIGS. 3 and 4.

First, the whole communication processing procedure executed through the communication device in the embodiment is described with reference to FIG. 3.

In this communication processing, when "address" information is transmitted from the diagnostic tool 5 in a mode shown as the data D1 in FIG. 7, the CPU 11 first executes receiving processing by means of low speed sampling, e.g., at 5 bps, through the edge detecting terminal 173 in a step 110. Details on the receiving processing at the speed of 5 bps will be described later by referring to FIG. 4.

After finishing the receiving operation at the speed of 5 bps, the CPU 11 switches the transmission and sampling speeds of the communication circuit 17 from 5 bps to a high speed of 10.4 Kbps in a step 120. That is, the communication terminal of the circuit 17 is switched from the edge detecting terminal (Port) 173 to the transmission and receiving terminals (TxD and RxD) 171 and 172.

Then, the CPU 11 exchanges various data shown as D2 to D8 in FIG. 7 with the diagnostic tool 5 by repeating operations in steps 130, 140, 170 and 180.

When there are no more requests from the diagnostic tool 5, the condition of "time over" in a step 150 is satisfied. After this "time over" condition is satisfied, the CPU 11 lastly switches the transmission and sampling speeds of the communication circuit 17 from 10.4 Kbps to 5 bps, that is, switches the communication terminal of the circuit 17 from the transmission and receiving terminals (TxD and RxD) 171 and 172 to the edge detecting terminal (Port) 173, and then ends the communication processing.

In a case where SCI format errors, e.g., a stop bit error, shown in FIG. 8, are detected when the data are exchanged with the diagnostic tool 5 in the step 180, or in a case where message format errors, e.g., an error in the checking code of the received message (check-sum, etc.), are detected, the processing is forcibly moved to a step 160, and after the transmission speed is switched, the communication processing is forcibly ended. More specifically, even when some data are transmitted from the diagnostic tool 5 thereafter, in the communication device the processing is started again from "receiving at the speed of 5 bps" in the step 110.

Next, detailed explanation will be made of the "receiving at the speed of 5 bps" in the step 110 by referring to FIG. 4.

In this receiving operation, the CPU 11 first executes initialization in a step 111. This initialization includes that of a receiving register in the RAM 13 shown in FIG. 1, that of edge detecting counts and the like.

After the initialization is over, the CPU 11 identifies the completion of receiving the data ("address" information) transmitted at the speed of 5 bps in a step 112. If the completion of the data receiving is identified (10 bits have been received), the CPU 11 ends this operation and returns to the communication processing shown in FIG. 3. As previously described, after the initialization the data are allowed to be sampled at a low speed through the edge detecting terminal 173 of the communication circuit 17.

On the other hand, in case where the non-completion of the data receiving is identified including the first fetching of the data at the speed of 5 bps in the step 112, the CPU 11 further identifies the existence of the edge detection by the edge detecting terminal 173 in a step 113. In the receiving processing, these identifying operations in the steps 112 and 113 are repeated until completion of the data receiving or detection of the data edge.

Now, if the edge of the data is detected including the start bit of the 5 bps data, the detection time is stored in a specified area in the RAM 13 in a next step 114. If this is the first edge of the data in which edge detection count is "1", that is, the falling edge of the start bit, the operations in the steps 112, 113 and 114 are repeated until a next edge is detected.

Then, when a second edge is detected, a difference between the current edge detecting time and the previous edge detecting time (first) is calculated in a step 116, and this calculated time difference is compared with time "150 ms (milliseconds)" in a next step 117.

Here, the time "150 ms" is a value obtained by including the margin of "50 ms" in "200 ms" which is 1 bit time of the 5 bps data. In the communication device in the embodiment, when the time difference is found to be equal to "150 ms"

or higher by the comparison in the step 117, the operations in the steps 112 to 117 are repeated by determining that normal data receiving is maintained.

Furthermore, in case where the time difference is found to be below the time "150 ms" by the comparison in the step 117, the communication device in the embodiment ends the receiving processing by determining that communication errors have taken place. Then, the device performs the operation again starting from the initialization in the step 111.

More specifically, the maximum edge interval time of the data transmitted at a high speed of, for instance, 10.4 Kbps, is 9 bit time from the first rising edge of the start bit thereof to the first rising edge of the stop bit, that is, about "1 ms". On the other hand, the minimum edge interval time of the 5 bps data is "200 ms" which is 1 bit time as described above, sufficiently larger compared with "1 ms". For this reason, an edge having a time interval shorter than the time "150 ms (200 ms−50 ms(margin))" is due to 10.4 Kbps data or noise, and in the communication device in the embodiment, in a case where there exists an edge having such a short time interval, communication errors are identified.

Figure 5A:
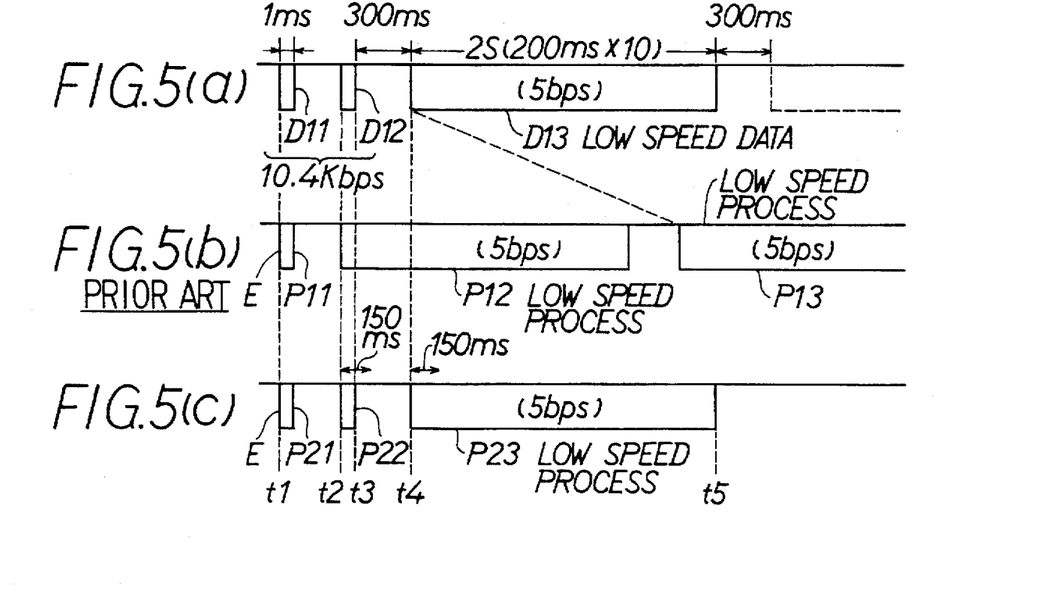

FIGS. 5(a) to 5(c) show a receiving processing mode in the communication device in the preferred embodiment in comparison with that in a conventional device. In the following, this receiving operation in the communication device in the embodiment is described in detail by referring to FIGS. 5(a) to 5(c).

Conventionally, with respect to data transmitted by the diagnostic tool in a mode shown in FIG. 5(a), as indicated by P11 to P13 in FIG. 5(b) corresponding to P1 to P3 in FIG. 9(b), the receiving operation has followed the following modes:

(1) In case where some error E is generated in the receiving processing P11 of data D11, since the operation is restarted from low speed sampling in the electronic controller side, the receiving processing P12 by means of the low speed sampling is started accompanying detection of the start bit edge of data D12 transmitted at a high speed;

(2) Once the receiving processing P12 by the low speed sampling is started, errors thereof cannot be detected until sampling of the specified bit length (200 m×10 bits=2 s) is over;

(3) As a result, in the electronic controller side, after this receiving processing P12 is over, the receiving processing P13 by means of low speed sampling is executed with respect to data D13 in the mode shown in FIG. 5(b) again; and (4) According to the above-described Standard ISO-9141, the maximum time allowed from identification of communication errors by the diagnostic tool to starting of retransmission of the data ("address" information) at the low speed of 5 bps is set at 300 ms. Thus, in the worst case, there is a possibility that the low speed data exchanges are repeated endlessly while shifts in synchronization are left intact.

In order to counter the defects of the receiving operation in the conventional device, as shown in FIG. 5(c), the communication device in the preferred embodiment follows the following modes:

(1) In case where an error E is generated for some reason or other in the receiving processing P21 of the data D11 at time t1, in the electronic controller side the operation is started again from the low speed sampling upon arrival of the data D12 at time t2. Thus, as in the case of the conventional device, receiving processing P22 by means of low speed sampling is started following detection of the start bit edge of the data D12 transmitted at a high speed;

(2) In the communication device in the embodiment, however, through the 5 bps receiving processing shown in FIG. 4 errors in the receiving processing P22 are detected at time t3 based on determination (time t3−time t2<150 ms) and the processing P22 is interrupted; and (3) Upon arrival of the low speed data D13 from the diagnosing tool 5 at time t4, as receiving processing P23 the, low speed sampling is performed again at the time t4 and at time t5 the processing P23 by the low speed sampling is normally ended.

According to the serial communication device in the preferred embodiment, even during data receiving by the low speed sampling, communication errors can be detected immediately and surely.

It is with error detection timing that the data receiving by the low speed sampling is performed again (to be exact, the operation is placed on standby for transmission of new data from the diagnostic tool 5). In the shortest case, the communication synchronization is restored with this timing. Thus, according to this error processing, time losses at the time of error occurences can be eliminated and the communication synchronization can be surely restored within a short time.

Furthermore, in the communication device in the embodiment as means for detecting edges at the time of low speed sampling (5 bps receiving processing) the special edge detecting terminal 173 shown in FIG. 2 is used. Thus, it is possible to surely detect the edge of the data irrespective of the data transmission and receiving sampling speeds.

However, in view of the fact that the error processing based on this edge detection is executed at the time of data receiving by the low speed sampling, it may be advisable to provide edge detecting means as software for detecting the relevant edge when data inputted from the receiving terminal (R×D) 172 are sampled at specified time intervals and the signal levels of these sampled data show a specified difference between the two respectively.

Even when the device is constructed having means as software for detecting the edge of serial data as in the above, errors can be sufficiently dealt with in terms of speeds. Moreover, in this case, the special edge detecting terminal 173 is made unnecessary, making it easier to realize edge detecting means.

In the above description of the preferred embodiment, reference was made to a case where the serial communication device provided by the present invention is applied to the system for data communications performed between the diagnostic tool 5 and the electronic controller 1 or 2 conforming to the International Standard ISO-9141. This device can also be applied to a communication system in which a communications channel is formed among a plurality of on-vehicle electronic controllers with one as a master and the others as slaves.

Furthermore, data communication protocol among these devices is not limited to that specified by the International Standard ISO-9141. Rather it can be selected optionally. The fact is that as long as a serial communication system by which serial data transmitted asynchronously at different speeds is used, the same effects as in the case of the preferred embodiment can be obtained by adopting the communication device of the invention.

The transmission speeds of the data are not limited to the two, low and high, either. For example, even when three data transmission speeds, low, medium and high, coexist, it is basically possible to perform the above-described receiving processing with respect to low or medium speed data. In this case, moreover, even when communication errors are generated during receiving of the data, time losses can be effectively eliminated by adopting the receiving processing.

As explained in detail above, according to the present invention, even in the asynchronous serial communication environment in which data transmitted at different speeds coexist and are exchanged, it is possible to effectively eliminate time losses when communication errors are generated.

The present invention is not limited to the disclosed embodiment and its modifications but may be modified in many other ways without departing from the spirit of the invention.

What is claimed is:

1. A serial communication method for asynchronously communicating serial data transmitted at different speeds between a plurality of devices through a communication line, the method comprising steps of:

receiving at one device through the communication line a first data from another device by a first fixed sampling speed;

determining a communication error when a second data which is to be communicated by a second fixed sampling speed different from the first fixed sampling speed is received during the first data receiving step; and restarting the first data receiving step upon determination of the communication error thereby inhibiting switching of sampling speeds from the first fixed sampling speed to the second fixed sampling speed.

2. A serial communication method according to claim 1, wherein the first fixed sampling speed is for receiving the first data to be transmitted when data transmission is started.

3. A serial communication method according to claim 2, wherein the first fixed sampling speed is lower than the second fixed sampling speed.

4. A serial communication method according to claim 1, wherein the determining step detects that a time difference between detecting times of a first edge and a next edge of each bit of the first data is shorter than a predetermined 1 bit time of the first data.

5. A serial communication method according to claim 4, wherein detecting the first edge and the next edge is performed by a special edge detecting terminal of the one device other than a terminal for receiving the second data.

6. A serial communication method according to claim 4, wherein detecting the first edge and the next edge is performed by a software on data sampled at a specified timing with respect to a specified difference in signal levels.

7. A serial communication method according to claim 4, wherein at least one of the devices is an on-vehicle electronic controller, and the first data is an address data to be transmitted first when a data linkage is to be established.

8. A serial communication method according to claim 4, wherein a length of the second data transmitted after the first data is shorter than 1 bit time of the first data.

9. A serial communication method according to claim 5, wherein a length of the second data transmitted after the first data is shorter than 1 bit time of the first data.

10. A serial communication method according to claim 6, wherein a length of the second data transmitted after the first data is shorter than 1 bit time of the first data.

11. A serial communication method according to claim 7, wherein a length of the first data transmitted after the first data is shorter than 1 bit time of the first data.

12. A serial communication device for asynchronously receiving a first serial data and a second serial data through a communication line at different transmission speeds, the device comprising:

edge detecting means for detecting rising and falling edges of the first serial data;

error processing means for determining a first serial data communication error when a difference in times of a first edge detection and a next edge detection by the edge detecting means is shorter than a 1 bit time of a low transmission speed data at a time of receiving the first serial data by a low speed sampling, and restarting receiving of the first serial data by the low speed data sampling at a time of a further edge detection time by the edge detecting means; and speed switching means for switching from the low speed sampling to high speed sampling to enable communication of the second serial data when no error in receiving the first serial data is determined.

13. A serial communication device according to claim 12, wherein the edge detecting means includes:

an edge detecting terminal provided exclusively and separately from a communication terminal provided for transmission of serial data.

14. A serial communication device according to claim 12, wherein the edge detecting means samples at a predetermined time interval the first serial data and the second serial data inputted through a communication terminal for receiving the first serial data and the second serial data and detects by software the rising and the falling edges when each signal level of the first serial data and the second serial data show a level change between successive rising and falling edges.

15. A serial communication device according to claim 12, wherein:

asynchronous serial communication is performed in a communication system between a slave device and a master device, the slave device including a plurality of electronic controllers mounted on a vehicle and the master device including an external device or one of the electronic controllers mounted on the vehicle;

the low transmission speed data is an address data of the slave device to be transmitted first from the master device to the slave device at a time of establishing data link between the master device and the slave device; and the slave device receives the address data by the low speed sampling.

* * * * *